United States Patent Office 2,807,858
Patented Oct. 1, 1957

2,807,858

PROCESS OF MANUFACTURING SYNTHETIC PEARL ESSENCE

Gideon E. Livingston, Amherst, Mass., assignor to Argenta Products Co., Eastport, Maine, a corporation of Maine No Drawing. Application August 26, 1955,
Serial No. 530,899

10 Claims. (Cl. 23—70)

The present invention relates to the art of manufacturing synthetic pearl essence.

It is well known that mother of pearl effects have been achieved through the use of a number of organic or inorganic preparations. The best known is guanine which is "fish silver" or "pearl essence" recovered from fish scales or fish organs. However, other substitutes for pearl essence have been proposed by prior investigators as disclosed by the prior art. Only a few inorganic compounds have been proposed which are supposed to be useful in their natural state. Generally, when lead compounds were used, they have required the use of chemical additives during their synthesis or the use of specially selected vehicles to produce luster. Although attempts were made to overcome difficulties and disadvantages, none, as far as I am aware, was entirely successful when carried into practice commercially on an industrial scale.

It has now been discovered that mother of pearl effects can be achieved through control of special operations involved in the novel combination embodying the present invention.

It is an object of the present invention to provide a novel process capable of manufacturing a product possessing the optical characteristics of natural pearl essence.

Another object of the invention is to provide a novel process adapted to be carried into practice on an industrial scale for the production of synthetic pearl essence having commercial acceptability.

The invention also contemplates providing a novel combination of operations capable of producing synthetic pearl essence without the use of chemical additives, dye intermediates or dyestuffs.

Other objects and advantages of the invention will become apparent from the following description of preferred embodiments of the novel process.

Broadly stated, the present invention contemplates the provision of a novel process in which a particular form a lead carbonate is produced which possesses desired luster characteristics of pearl essence, without resorting to the use of any additives, luster enhancers or selected pigment vehicles. The novel process comprises forming crystals of a lead carbonate under controlled conditions of temperature and acidity which favor the synthesis of relatively large and lustrous crystals. I have found that there is a direct relationship between crystal size and luster of the crystal mass. In the production of "basic white lead" used in the paint industry, crystal sizes of about 0.25 to 2.0 microns are produced. The crystals which are formed in my novel process are from about 5.0 to 30 microns in diameter and possess a hexagonal structure generally associated with the basic lead carbonate. It is an important feature of my process that the desirable crystal size is not only attained, but that it can indeed be controlled through the control of temperature, pH and gas flow. The crystals are made by passing carbon dioxide gas through a solution of normal lead acetate of concentration no greater than 50%, based on the weight of the hydrated neutral lead acetate. The temperature should be above 50° C., greater luster resulting when the temperature of the solution is maintained between about 85° C. and about 100° C. (about 165° F. to about 212° F.). Since acetic acid is produced as an end product of the carbonation reaction, there is a continuous increase in acidity during carbonation. It is necessary to maintain the pH of the solution above about 4.5 and preferably about 5.5 by neutralization or by removal of the free acid. Furthermore, it is desirable to remove crystals from the solution as soon as they are formed to prevent lumping due to overcarbonation.

In carrying the invention into practice, it is preferred to use one vessel serving as a dissolver-preheater-neutralizer from which the hot lead acetate solution is pumped through a strainer into the reaction vessel. The latter, consisting of a cylindrical column, allows the solution to be carbonated forming the crystals. The solution is continuously pumped out of the reactor through a filter press and into the first vessel where it is neutralized by the addition of alkali. An ion exchange column (either cation to substitute $Na^+$ for $H^+$ or anion to substitute $OH^-$ for $C_2H_3O_2^-$) may be inserted between the reactor and the preheater as a substitute for the alkali neutralization. A continuous extractor may also be substituted for the filter press as a means of continuously collecting the crystals.

The carbon dioxide gas should be introduced into the reactor under relatively low pressure, i. e., approximately 1 to 5 p. s. i. more than that required to overcome the hydrostatic pressure of the solution in the column. The optimum pressure depends upon the flow rate of the lead solution through the column, the capacity of the reactor and the temperature used, a greater degree of carbonation being required to induce equal precipitation as the temperature of the solution is raised. To achieve uniform crystal formation throughout the reactor, it is desirable to introduce the gas into the lead solution by means of a sparging device. Control of gas pressure may be achieved through the use of a reducing pin valve, manually or automatically operated. Crystals of maximum luster are obtained when their rate of formation, controllable by adjustment of gas flow and temperature, is kept slow.

For the purpose of giving those skilled in the art a better understanding of the invention and/or a better appreciation of the advantages of the invention, the following illustrative examples are given:

Example I

About 300 parts by weight of neutral lead acetate was dissolved in distilled water to give 1000 parts by weight of solution. The solution was heated to boiling with stirring, until the lead acetate was fully dissolved. Gaseous carbon dioxide was bubbled through the hot solution by means of a glass tube drawn to a capillary, for a period of about two minutes. About 9.2 parts by weight of lustrous crystals were formed and removed by filtration. The filtered solution was heated again to about 93° C. or 200° F. and carbon dioxide was bubbled through once more, resulting in the further precipitation of lustrous crystals. After these were removed by filtration, the pH of the mother liquor was adjusted from 4.5 to 6.5 and the resulting solution was again reheated and used to produce additional crystals by reaction with carbon dioxide gas. By repeatedly filtering, adjusting the pH of the solution to about 6.5, heating it to about 93° C. or 200° F. and bubbling the gas through, four additional fractions of lustrous crystals were produced.

Example II

About one-half liter of solution containing 10 parts by weight of neutral lead acetate to 90 parts of distilled water was heated to about 82–88° C. or 180–200° F.

by passage through a glass tube (1" outside diameter and 12" long) wound with an electrical tape heating element. Thence the solution was circulated by gravity through an outer tube of a water condenser (10" long) in which, while flowing downward, it was subjected to an upward flow of carbon dioxide gas introduced at the bottom of the condenser jacket through a capillary opening. The lustrous crystals formed were carried along by the solution into a vessel by means of tubing. A bacteriological filter candle, set in the vessel and connected to a small liquid pump, drew from the vessel the hot solution, but not the crystals. Thus, the latter settled in the vessel and were collected at the end of the run. The pump returned the mother liquor to a separatory funnel hung over a glass column containing an anionic ion exchange resin designed to remove acetate or carbonate ions present and substitute hydroxyl ions for them. The solution flowed by gravity through the ion exchange column and thence by gravity also into the heating tube already described. Thus, a continuous system for the production of the lustrous crystals was provided, the rate of flow being governed by appropriate clamps on the tubing, the stopcock on the separatory funnel and the speed of the pump. The rapidity with which the solution flowed through the resin bed was the limiting factor in the rate of flow. A satisfactory synthetic pearl essence was produced by the foregoing procedure.

*Example III*

About 32 parts by weight of neutral lead acetate (crystalline) was added to about 128 parts by weight of water in a steam-jacketed kettle. The kettle was heated and the mixture stirred until the solution was brought to a boil. The hot solution was pumped from the kettle into a tube, in which carbon dioxide gas at low pressure (5 pounds per square inch) was being bubbled, thence to a filter press in which the crystals formed in the tube were collected. The effluent of the filter press was returned by means of another pump into the heating kettle, where the pH of the hot solution was maintained in the range of about 5.0 to about 7.0 by means of the dropwise addition of 10 normal sodium hydroxide solution from an alkali stock solution suspended above the kettle. After one hour of continuous operation, the pumps were stopped, the filter press opened and 12.8 parts by weight of crystals of synthetic pearl essence were collected.

In all three illustrative examples, the crystals of synthetic pearl essence obtained appeared identical when examined microscopically. A majority of the crystals possessed a hexagonal structure, their size ranging from 3.0 to 30 microns, although most were approximately 5.0 to 10 microns in diameter. The crystal masses obtained in all instances were highly lustrous and exhibited a pearliness which is akin to that of natural pearl essence from fish scales.

The pearl essence obtained by the present invention can be used to achieve pearly effects by application to plastics, metals, wood, glass, cloth feathers, leather, ceramic or paper, using any type of film forming vehicles such as nitro-cellulose lacquers. It can be applied by dipping, brushing or spraying, and may be used in combination with coloring dyes or pigments. It can also be incorporated directly into resins used in plastics for molding, casting or extrusion.

The number of applications which can be found for the pearl essence made by my process is limited only by the imagination of the users. A few typical applications might include the following products:

Automobile finishes
Bathroom accessories
Buttons
Displays
Household appliances
Jewelry
Millinery
Nail polish
Religious goods
Store decorations
Shoes and other leather goods
Toys It is to be observed that the present invention provides a novel process for producing crystals of synthetic pearl essence which are inherently lustrous and therefore require no additives either during crystallization or thereafter. It has been observed however that their luster is enhanced when they are transferred from an aqueous phase into an organic lacquer. The crystals are sufficiently heat stable so that they may be used as synthetic pearl essence in the plastic field as well as a substitute for natural pearl essence in numerous applications.

It is to be noted that the present invention is not to be confused with prior processes for making basic lead carbonate for pigment purposes. The physical properties which are desirable in white pigments for paint use include opacity, whiteness, flatness, etc. As those skilled in the art know, these properties are just the opposite to those required in synthetic pearl essence. Some prior proposals have been directed to the manufacture of pearl essence but required the use of basic lead acetate as a starting material, of adjuncts, dye intermediates, dyestuffs, etc., of low temperatures and of undesirable pH's and other features.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The process of manufacturing synthetic pearl essence possessing optical properties approximating those of natural pearl essence which comprises forming a solution of normal lead acetate having a concentration no greater than 50%, maintaining the temperature above about 50° C. and not more than about 100° C., controlling the pH of the solution above about 4.5 and up to about 7.0, and passing carbon dioxide gas through said solution whereby relatively large and lustrous crystals of lead carbonate are formed, and removing said crystals from the solution as soon as possible after they are formed to prevent lumping due to overcarbonation.

2. The process of manufacturing synthetic pearl essence possessing optical properties approximating those of natural pearl essence which comprises forming a solution of normal lead acetate having a concentration no greater than 50%, maintaining the temperature of the solution between about 85° C. and about 100° C., controlling the pH of the solution above about 5.5 and up to about 7.0, and passing carbon dioxide gas through said solution whereby relatively large, lustrous crystals of lead carbonate are formed having a diameter of about 5 to about 30 microns, and removing said crystals from the solution as soon as possible after they are formed to prevent lumping due to overcarbonation.

3. The process of manufacturing synthetic pearl essence possessing optical properties approximating those of natural pearl essence which comprises forming a hot lead acetate solution having a concentration no greater than 50%, straining solids from said solution, pumping solution into a column thereof, maintaining the temperature between about 85° C. and about 100° C., passing carbon dioxide gas through said column to form lead carbonate and acetic acid, neutralizing said acid to maintain the pH to above about 5.5 and up to about 7.0 whereby relatively large lustrous crystals of lead carbonate are formed, and removing said crystals from the solution as soon as possible after they are formed to prevent lumping due to overcarbonation.

4. The process of manufacturing synthetic pearl essence possessing optical properties approximating those of natural pearl essence which comprises forming a solution of hot lead acetate having a concentration no greater than 50%, maintaining the temperature of the solution at about 82° C. to about 88° C., adjusting the pH from about 4.5 to about 7.0, bubbling gaseous carbon dioxide through said solution to form relatively large lustrous crystals of lead carbonate, and filtering said crystals of lead carbonate promptly from said solution.

5. The process of manufacturing synthetic pearl essence possessing optical properties approximating those of natural pearl essence which comprises forming a solution of hot lead acetate having a concentration no greater than 50%, maintaining the temperature of the solution at about 82° C. to about 88° C., adjusting the pH from about 4.5 to about 7.0, bubbling gaseous carbon dioxide through said solution to form relatively large lustrous crystals of lead carbonate, filtering said crystals of lead carbonate continuously and promptly from said solution and reusing said solution, and repeating the aforesaid operations.

6. The process of manufacturing synthetic pearl essence possessing optical properties approximating those of natural pearl essence which comprises forming a solution of lead acetate having a concentration no greater than 50%, heating said solution to a temperature of about 82° C. to about 88° C., flowing said solution at the aforesaid temperature downwardly through a column, subjecting said downwardly flowing column of solution to an upward flow of carbon dioxide gas, maintaining the pH of said solution to a value within a range of about 4.5 to about 7.0 whereby large, lustrous crystals of lead carbonate are formed, and removing said crystals from the solution as soon as possible after they are formed to prevent lumping due to overcarbonation.

7. The process of manufacturing synthetic pearl essence possessing optical properties approximating those of natural pearl essence which comprises forming a solution of lead acetate having a concentration no greater than 50%, heating said solution to a temperature of about 82° C. to about 88° C., flowing said solution at the aforesaid temperature downwardly through a column, subjecting said downwardly flowing column of solution to an upward flow of carbon dioxide gas, maintaining the pH of said solution to a value within a range of about 4.5 to about 7.0 whereby large, lustrous crystals of lead carbonate are formed, and filtering said crystals continuously and promptly from said crystals from said solution and reusing said solution, and repeating the aforesaid operations.

8. The process of manufacturing synthetic pearl essence possessing optical properties approximating those of natural pearl essence which comprises forming a solution of lead acetate having a concentration no greater than 50%, heating said solution to a temperature of about 82° C. to about 88° C., flowing said solution at the aforesaid temperature downwardly through a column, subjecting said downwardly flowing column of solution to an upward flow of carbon dioxide gas, maintaining the pH of said solution to a value within a range of about 4.5 to about 7.0 whereby large, lustrous crystals of lead carbonate are formed, filtering said crystals promptly from said solution, and subjecting said solution to an ion exchange operation to control the pH to a value within the range of about 4.5 to about 7.0.

9. The process of manufacturing synthetic pearl essence possessing optical properties approximating those of natural pearl essence which comprises forming a hot lead acetate solution having a concentration no greater than 50% and having a temperature of about 74° C. to about 100° C., continuously pumping said solution into a reactor, continuously flowing carbon dioxide gas into said solution, continuously maintaining the pH of said solution to a value within a range of about 4.5 to about 7.0, and filtering relatively large lustrous crystals of lead carbonate promptly from said solution.

10. The process of manufacturing synthetic pearl essence possessing optical properties approximating those of natural pearl essence which comprises forming a hot lead acetate solution having a concentration no greater than 50% and having a temperature of about 74° C. to about 100° C., continuously pumping said solution into a reactor, continuously flowing carbon dioxide gas into said solution, continuously maintaining the pH of said solution to a value within a range of about 4.5 to about 7.0, continuously and promptly filtering relatively large lustrous crystals of lead carbonate from said solution, and returning said solution for re-use in the reactor.

References Cited in the file of this patent

UNITED STATES PATENTS

| | | |
|---|---|---|
| 85,796 | Dale et al. | Jan. 12, 1869 |
| 799,770 | Wultze | Sept. 19, 1905 |
| 1,117,358 | Euston | Nov. 17, 1914 |
| 1,738,081 | Smith | Dec. 3, 1929 |

FOREIGN PATENTS

| | | |
|---|---|---|
| 273,660 | Great Britain | July 28, 1927 |